United States Patent [19]

Bhide et al.

[11] Patent Number: 5,852,717
[45] Date of Patent: Dec. 22, 1998

[54] PERFORMANCE OPTIMIZATIONS FOR COMPUTER NETWORKS UTILIZING HTTP

[75] Inventors: Chandrashekhar W. Bhide, Sunnyvale; Jagdeep Singh; Don Oestreicher, both of Cupertino, all of Calif.

[73] Assignee: Shiva Corporation, Bedford, Mass.

[21] Appl. No.: 752,500

[22] Filed: Nov. 20, 1996

[51] Int. Cl.[6] .................................................. G06F 17/00
[52] U.S. Cl. .............................. 395/200.33; 395/200.49; 395/200.59
[58] Field of Search .................. 395/200.32, 200.33, 395/200.58, 200.59, 200.49, 200.5; 364/551.01

[56] References Cited

U.S. PATENT DOCUMENTS

| | | | |
|---|---|---|---|
| 4,891,785 | 1/1990 | Donohoo | 395/200.32 |
| 5,339,435 | 8/1994 | Lubkin et al. | 395/200.5 |
| 5,710,918 | 1/1998 | Lagarde et al. | 395/200.32 |

*Primary Examiner*—Ellis B. Ramirez
*Attorney, Agent, or Firm*—Townsend and Townsend and Crew LLP

[57] ABSTRACT

Systems and methods of increasing the performance of computer networks, especially networks connecting users to the Web, are provided. Performance is increased by reducing the latency the client experiences between sending a request to the server and receiving a response. A connection cache may be maintained by an agent on the network access equipment to more quickly respond to request for network connections to the server. Additionally, the agent may maintain a cache of information to more quickly respond to requests to get an object if it has been modified. These enhancements and other described herein may be implemented singly or in conjunction to reduce the latency involved in sending the requests to the server by saving round-trip times between computer network components.

48 Claims, 15 Drawing Sheets

PERFORMANCE OPTIMIZATIONS FOR COMPUTER NETWORKS UTILIZING HTTP

BACKGROUND OF THE INVENTION

The present invention is related to increasing performance of networked computer systems and, more particularly, increasing the performance of computer systems accessing the World Wide Web ("Web") on the Internet.

The Internet is a network which provides avenues for worldwide communication of information, ideas and messages. Although the Internet has been utilized by academia for decades, recently there has been almost an explosion of interest in the Internet and the information residing thereon. The Web accounts for a significant part of the growth in the popularity of the Internet, perhaps because of the user-friendly graphical user interfaces ("GUIs") of browsers that are readily available for accessing the Web.

The World Wide Web makes hypertext documents available to users over the Internet. A hypertext document does not present information linearly like a book, but instead provides the reader with links or pointers to other locations so that the user may jump from one location to another. The hypertext documents on the Web are accessed through the client/server protocol of Hypertext Transport Protocol ("HTTP").

The Internet utilizes the Transmission Control Protocol/Internet Protocol ("TCP/IP") to network very diverse and dissimilar systems. In Windows 3.x environments, the browser typically utilizes a dynamic link library WINSOCK.DLL to communicate with the TCP/IP-based Internet. Although the hardware backbone of the Internet is a series of high-speed communications links between educational, research, government, and commercial mainframe computer systems, a great number of the users that access the Web utilize a browser that is connected to the Internet through a relatively slow or weak link (e.g., a 28.8K modem over an analog phone line) to network access equipment networked to the Internet.

The network access equipment typically has a fast connection to the Internet (e.g., a T-1 connection at 1.54 MB). Network access equipment may be a remote access server for allowing remote users to connect to intranet and Internet resources. Such a remote access server, the LanRover™ Access Switch remote access server, is available from Shiva Corporation, Bedford, Mass. Other types of network access equipment are utilized by Internet Service Providers ("ISPs") to provide Internet access to customers. Thus, the network access equipment is networked between the computer running the browser and the Web server providing what is called the Point of Presence ("POP") for the user.

Network performance in general is hampered because the network link between users and their POP commonly has a significantly lower bandwidth than the network link between the POP and the Web server. Additionally, there is a significant amount of latency in conventional networks while the client waits for a response from the Web server. Accordingly, there is a need for systems and methods for increasing the performance of the computer networks, preferably without requiring modification of existing browsers.

SUMMARY OF THE INVENTION

The present invention provides systems and methods of increasing the performance of computer networks, especially networks connecting users to the Web. Performance may be increased by reducing the latency the client experiences between sending a request to the server and receiving a response. A connection cache may be maintained by an agent on the network access equipment to more quickly respond to request for network connections to the server. Additionally, the agent may maintain a cache of information to more quickly respond to requests to get an object if it has been modified. These enhancements may be implemented singly or in conjunction to reduce the latency involved in sending the respective requests to the server by saving round-trip times between the agent and the server. The invention complements caching provided by browsers and other components (e.g., proxy servers).

Performance may also be increased by the network access equipment sending an HTTP request to either the Web server or a proxy server based on an analysis of the HTTP request. The Web browsers may then utilize a proxy server transparently, without specifically sending requests to the proxy server.

Additionally, performance may be increased by effectively increasing the effectively bandwidth of the weak link between the client and the network access equipment. A client hook intercepts client requests to the server and modifies the client requests to increase performance. The modified requests are then sent to the agent which reconstructs the client requests from the modified requests and sends the client requests to the server. For example, multiple client requests may be combined into a single modified requests or individual client requests may be intelligently compressed for more efficient utilization of the weak link.

In one embodiment, the present invention provides a method executed by an agent in a computer network between clients and a server for increasing performance between the clients and the server, the method comprising the steps of: receiving a first request from a client to open a single network connection to the server; sending a plurality of requests to the server to open a plurality of network connections to the server; receiving a second request from the client; and sending the second request to the server using one of the plurality of network connections. Accordingly, the plurality of network connections to the server are opened in response to the first request from the client to open a single network connection.

In another embodiment, the present invention provides a method executed by an agent in a computer network between clients and a server for increasing performance between the clients and the server, the method comprising the steps of: receiving a first request from a client to get an object from the server if the object has been modified after a specific timestamp; sending the first request to the server; receiving a first response from the server that the object has not been modified after the specific timestamp; sending the first response to the client; storing an identifier for the object and a timestamp in a cache; receiving a second request from the client to get the object from the server if the object has been modified after the specific timestamp; and if the timestamp stored in the cache is within a predetermined amount of time from the current time, sending a second response to the client that the object has not been modified after the specific timestamp without sending the second request to the server.

In another embodiment, the present invention provides a method executed by an agent in a computer network between a client and a Web and proxy servers for increasing performance between the client and the Web server, comprising the steps of: receiving an HTTP request from a client; and sending the HTTP request to either the Web server or the proxy server depending on the HTTP request, the proxy server storing information available on the Web server. Accordingly, the client does not need to be modified or configured to utilize the proxy server.

In another embodiment, the present invention provides a method for increasing performance between a client on a client computer and a server utilizing a client hook on the client computer and an agent between the client computer and the server, comprising the steps of: the client hook intercepting requests from the client to the server; the client hook modifying the requests from the client; the client hook sending the modified requests to the agent; the agent reconstructing the requests from the client according to the modified requests; and the agent sending the requests from the client to the server. The client hook may intercept requests from the client to open a network connection to the server and immediately respond so that the client does not have to wait for a response that a network connection is open. The agent may open the network connection when required or store a cache of open network connections to the server. Also, the client hook may intercept requests from the client to compress information into changes from information in a previous request. The agent has the previous information stored and reconstructs the hew information from the changes. Thus, the communication between the client hook and the agent increases performance of communication between the client and the server.

A feature of the present invention is that performance is increased without necessitating modification of the client or server. As no modifications of a Web browser is required, the enhancements may be implemented to transparently increase the performance of the browser, regardless of the browser that is utilized. Other features and advantages of the present invention will become apparent upon a perusal of the remaining portions of the specification and drawings.

DESCRIPTION OF PREFERRED EMBODIMENTS

In the description that follows, the present invention will be described in reference to preferred embodiments that increase the performance of Web browsers utilizing a weak link to network access equipment. The present invention, however, is not limited to any particular embodiment or computer network. Therefore, the description the embodiments that follow is for purposes of illustration and not limitation.

Figure 1:
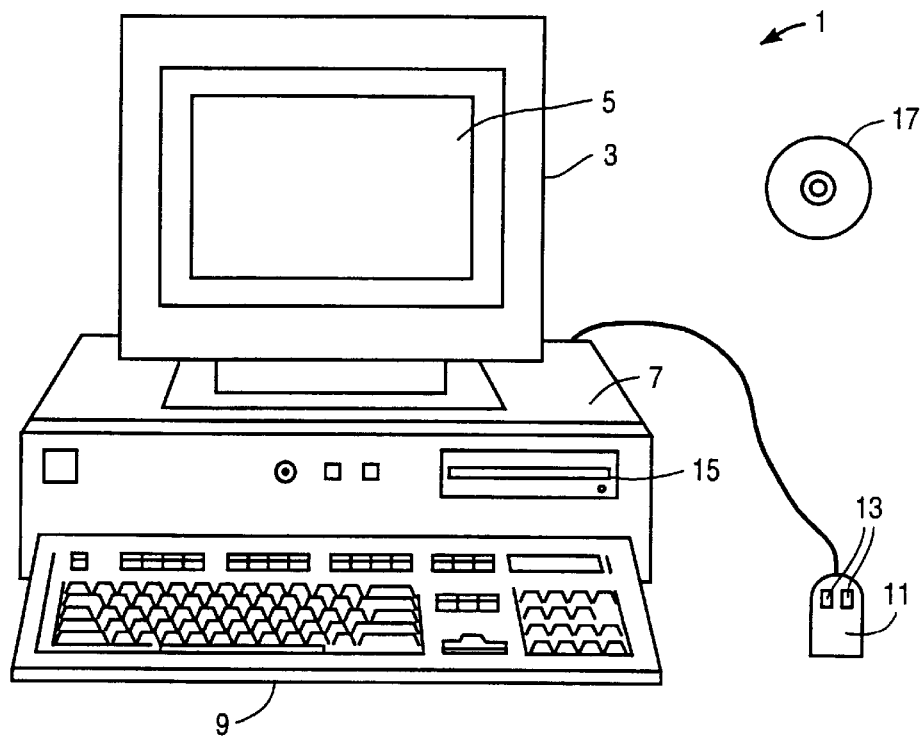
FIG. 1 illustrates an example of a computer system used to execute software of an embodiment of the present invention.

FIG. 1 illustrates an example of a computer system used to execute software of an embodiment of the present invention. FIG. 1 shows a computer system 1 which includes a monitor 3, screen 5, cabinet 7, keyboard 9, and mouse 11. Mouse 11 may have one or more buttons such as mouse buttons 13. Cabinet 7 houses a CD-ROM drive 15, a system memory and a hard drive (see FIG. 2) which may be utilized to store and retrieve software programs incorporating computer code that implements the present invention, data for use with the present invention, and the like. Although a CD-ROM 17 is shown as an exemplary computer readable storage medium, other computer readable storage media including floppy disks, tape, flash memory, system memory, and hard drives may be utilized. Cabinet 7 also houses familiar computer components (not shown) such as a central processor, system memory, hard disk, and the like.

Figure 2:
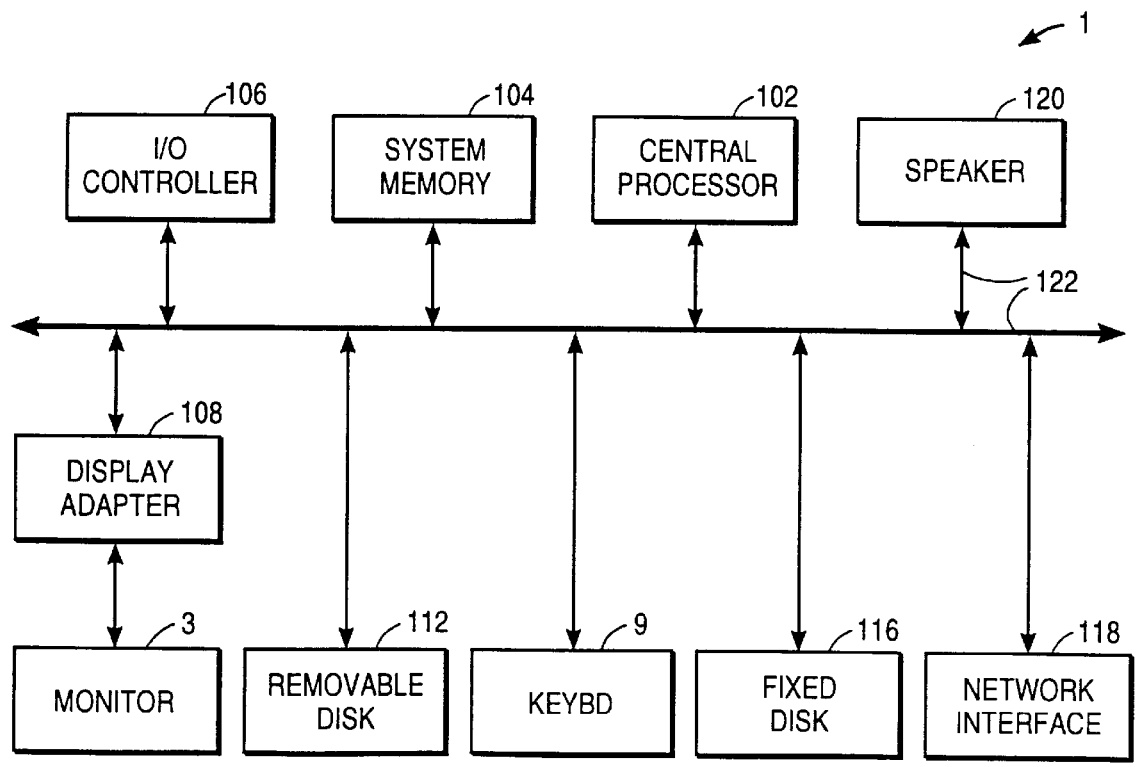
FIG. 2 shows a system block diagram of a typical computer system used to execute software of an embodiment of the present invention.

FIG. 2 shows a system block diagram of computer system 1 used to execute the software of an embodiment of the present invention. As in FIG. 1, computer system 1 includes monitor 3 and keyboard 9. Computer system 1 further includes subsystems such as a central processor 102, system memory 104, I/O controller 106, display adapter 108, removable disk 112 (e.g., CD-ROM drive), fixed disk 116 (e.g., hard drive), network interface 118, and speaker 120. Other computer systems suitable for use with the present invention may include additional or fewer subsystems. For example, another computer system could include more than one processor 102 (i.e., a multi-processor system) or a cache memory.

Arrows such as 122 represent the system bus architecture of computer system 1. However, these arrows are illustrative of any interconnection scheme serving to link the subsystems. For example, a local bus could be utilized to connect the central processor to the system memory and display adapter. Computer system 1 shown in FIG. 2 is but an example of a computer system suitable for use with the present invention. Other configurations of subsystems suitable for use with the present invention will be readily apparent to one of ordinary skill in the art.

Figure 3:
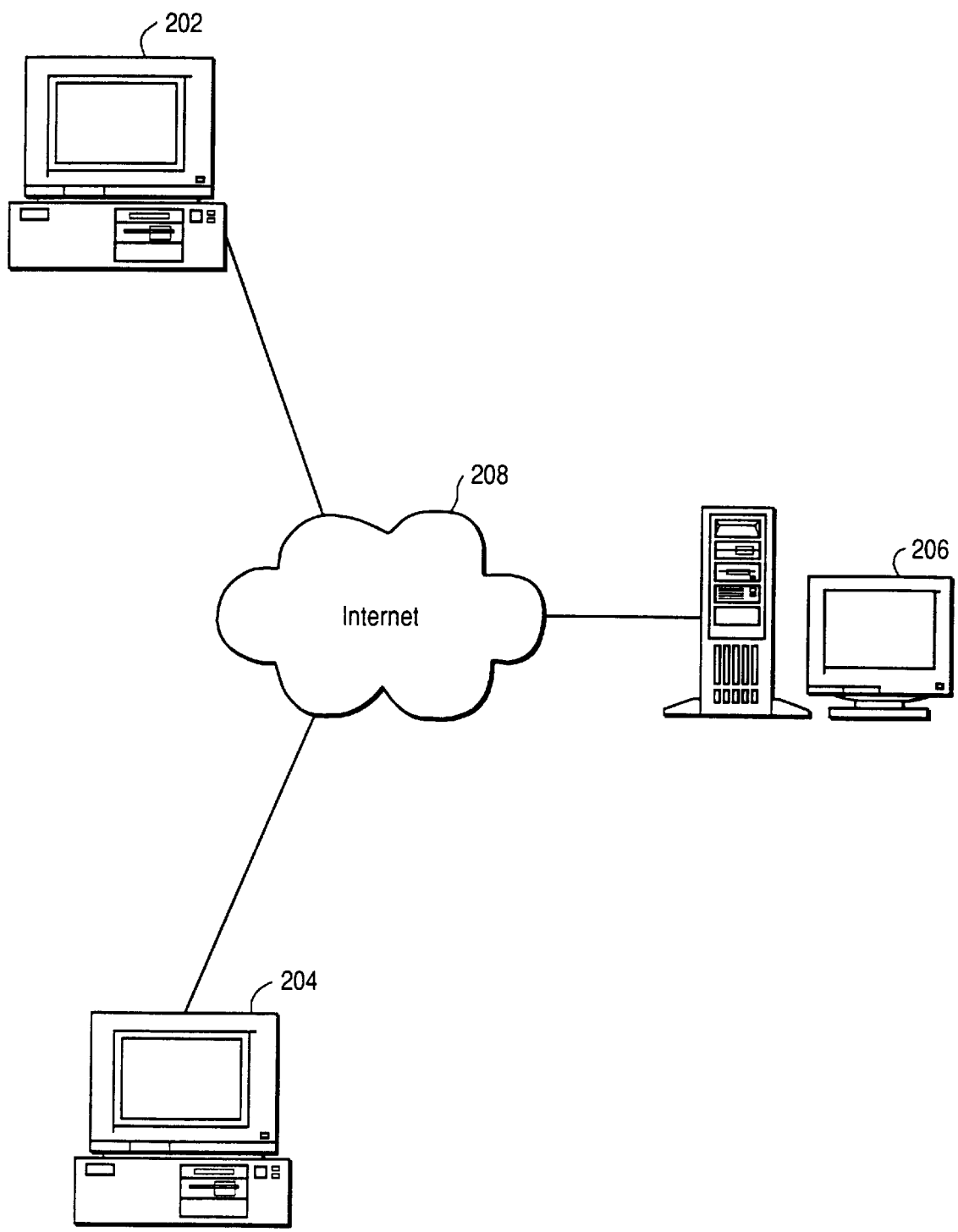
FIG. 3 shows a diagram of multiple computers networked over the Internet.

Preferred embodiments of the invention increase the performance of Web browsers' (or clients') access to the Web on the Internet. FIG. 3 shows a diagram of multiple computers networked over the Internet. Computers 202, 204 and 206 are interconnected by the Internet 208, which is a series of high-speed communications links between educational, research and commercial computer sites around the world. Internet computers use the TCP/IP as the communications protocol.

The Web utilizes the HTTP client/server protocol, which is a request-response protocol. HTTP transactions include four stages: connection, request, response, and disconnection. In the connection stage, the client attempts to open a network connection to the server. Unless otherwise specified, HTTP attempts to use port 80 on the server for this connection. Establishing a connection involves one round-trip time from the client to the server as the client requests to open a network connection and the server responds that a network connection has been opened. Although the discussion herein focuses on version 1.0 of HTTP, the invention is not limited to any version of HTTP or to HTTP specifically.

After a network connection is open, the client may send an HTTP request to the server in the request stage. A request stage involves one half of a round-trip time as the request goes from the client to the server. Once the server receives the request, the server responds by sending a response to the client in the response stage. As with the request, the response stage involves one half of a round-trip time as the response goes from the server to the client.

The disconnection stage closes the network connection to the server. This stage involves one half of a round-trip time and may occur many different ways. The server may close the connection after the response is sent or by the client by sending a Stop sequence (e.g., the user clicked on the Stop button in the browser or the Back/Forward buttons). Conventional browsers show each of the four stages on a status line on the screen.

The terms of "client" and "server" are relative terms. A client is an entity that is making a request to a server which typically responds back to the client. However, these labels are request-response specific and are not an indication that the entities' roles are fixed. In preferred embodiments, the client is a browser and the server is a Web server. The browser may be executed on a computer similar to the one shown in FIGS. 1 and 2. The server may be similar but is typically a much more powerful system including faster subsystems and more storage capacity.

Figure 4:
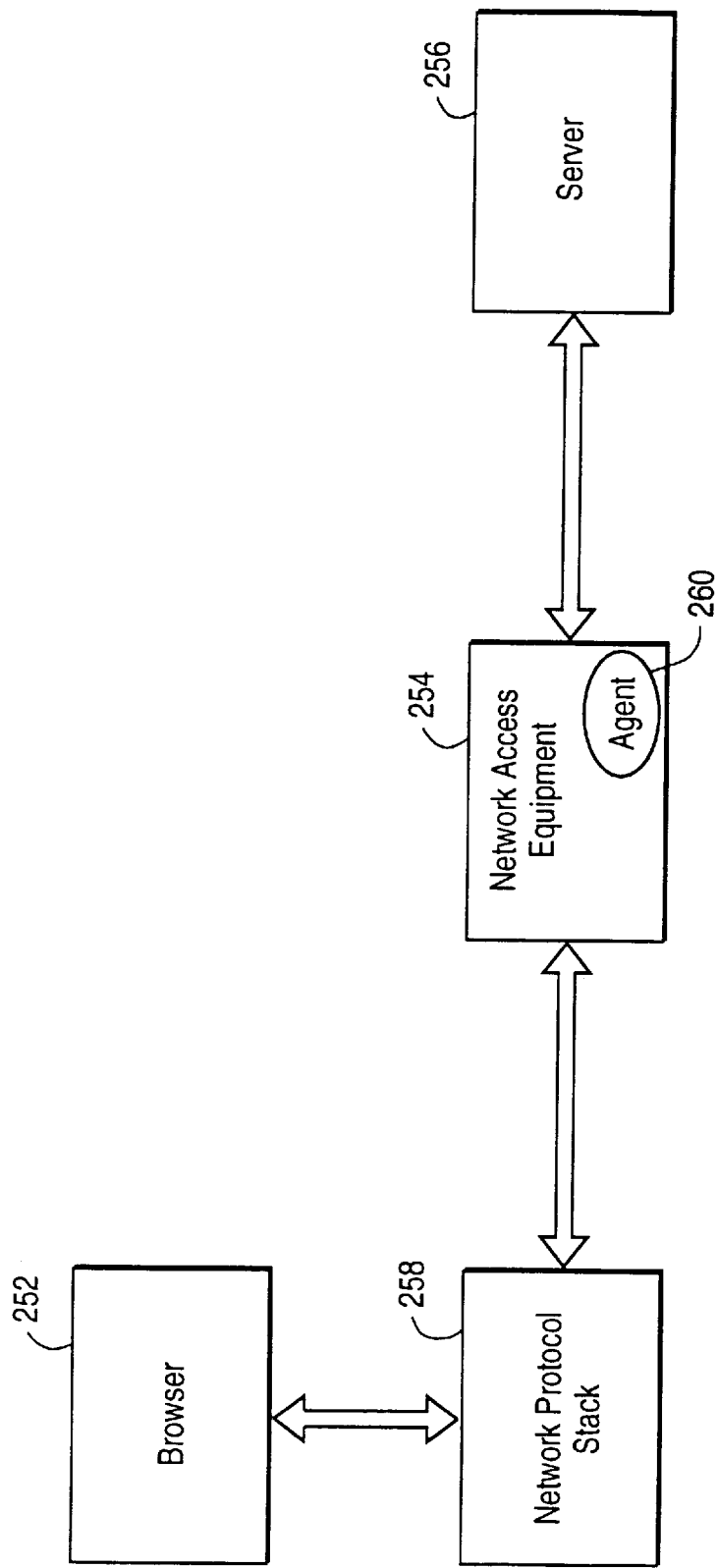
FIG. 4 is a block diagram of a browser connected to a Web server through network access equipment including an agent.

FIG. 4 is a block diagram of a browser connected to a Web server through network access equipment including an agent. The computer network shown includes a Web browser 252, network access equipment 254 and a Web server 256. The browser communicates over a link to the network access equipment via a network protocol (e.g., TCP/IP) stack 258. The browser and network protocol stack reside on the client computer system. The network access equipment is typically an electronic box and may include some of the subsystems shown in FIG. 2. The Web server resides on a server which is typically a remote computer system.

The network access equipment includes an agent 260. The agent is a program that includes embodiments of the invention. The computer code for the agent may reside on any computer readable storage medium including dynamic random access memory, electrically erasable programmable read only memory, or flash memory just to name a few. In a preferred embodiment, the agent resides on a LanRover™ Access Switch remote access server available from Shiva Corporation, Bedford, Mass.

Figure 5:
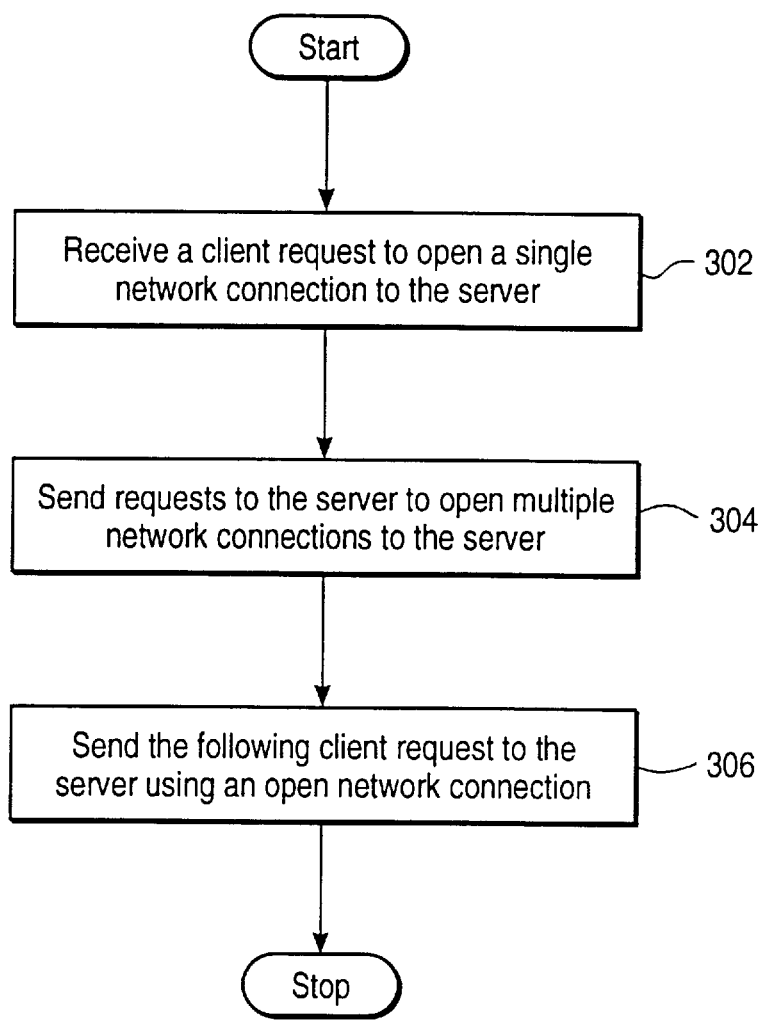
FIG. 5 shows a high level flowchart of a process of opening multiple network connections to the server in response to a request to open a single network connection.

FIG. 5 shows a high level flowchart of a process of opening multiple network connections to the server in response to a request to open a single network connection. The process shown is executed by an agent on the network access equipment. At step 302, the agent receives a client request to open a single network connection to the server.

In response to the client request to open a single network connection to the server, the agent sends multiple requests to the server to open multiple network connections to the server at step 304. Thus, multiple network connections to the server are opened in response to a client request to open a single network connection. Preferably, the agent requests persistent network connections. Once one of the network connections is open, the agent will receive a response from the server and send that response to the client. The client will then issue a request to the server over the open network connection which will be received by the agent. At step 306, the agent sends the following client request to the server using the open network connection.

Oftentimes, the agent will receive another client request to open a single network connection to the server. Since the agent previously opened multiple network connections, the agent responds immediately that a network connection is available, thus saving a round-trip time between the agent and server. The client then issues the following client request over the open network connection. The agent may store the open network connections in a cache, which will be described more detail in reference to FIG. 6.

For simplicity, the discussion herein describes the interaction of the agent with a single client browser and a single Web server. However, in practice, the agent is typically in communication with multiple clients and multiple Web servers. The methods of the present invention are not isolated to increasing the performance of each individual client alone. For example, one client may open multiple network connections to the server by issuing a request to open a single network connection. Subsequently, another client may request to open a single network connection to the same server. The agent may then immediately grant a network connection to this client as a network connection has already been opened. Thus, the actions of one client may also result in an increase in performance of other clients. The agent preferably opens another network connection to the server to replace the one that has become used.

Figure 6:
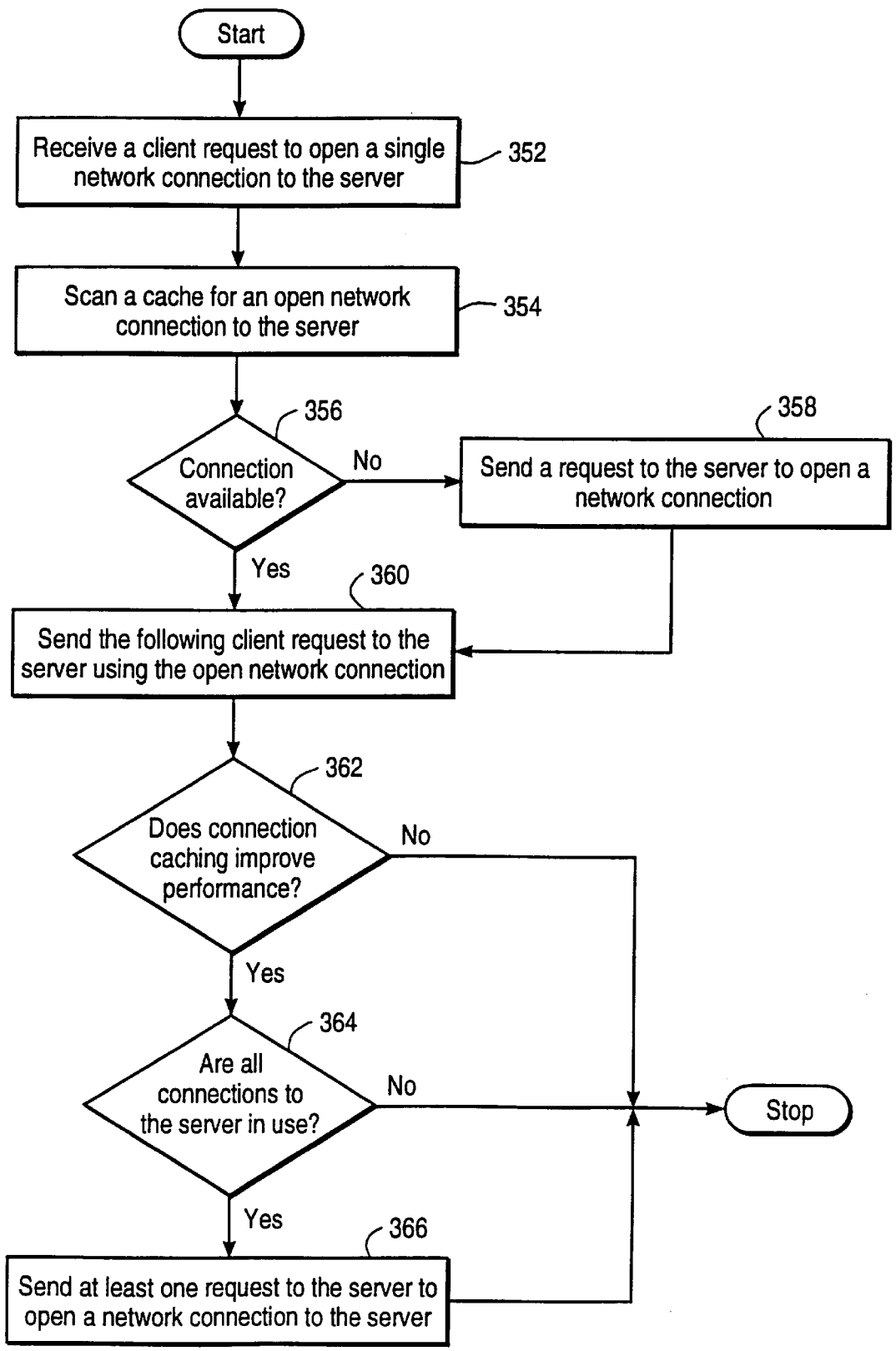
FIG. 6 shows a flowchart of another process of opening multiple network connections to the server in response to a request to open a single network connection utilizing a cache.

FIG. 6 shows a flowchart of another process of opening multiple network connections to the server in response to a request to open a single network connection utilizing a cache. In this embodiment, the agent maintains a cache of network connections to the server (or servers). At step 352, the agent receives a client request to open a single network connection to the server.

The agent scans the cache for an open network connection to the server at step 354. If an open network connection to the server is not available in the cache at step 356, the agent sends a request to the server to open a network connection. Although this embodiment opens a single network connection at this point and makes a subsequent determination if connection caching improves performance, in another embodiment, the agent sends multiple requests to the server to open multiple network connections and bypasses the subsequent determination.

If an open network connection to the server is available in the cache, the agent sends a response to the client that a network connection is open. The client sends a client request to the server using the open network connection which the agent sends to the server at step 360.

At step 362, the agent determines if network connection caching for the server improves performance. This determination may be made from many factors including the number of times the agent has a "hit" in the cache, the overhead required to maintain the cache, whether the server is allowing the network connections to stay open in response to a request to "keep open" the connection (i.e., persistent connection), and the like. The agent may request that the server "keep open" the connection but honoring this request is at the discretion of the server.

The agent checks if all the network connections to the server in the cache are in use at step 364. If connection caching does improve performance and all the network connections to the server are in use, the agent sends at least one request to the server to open a network connection at step 366. Multiple network connections may be opened to the server if it has been determined that this improves performance. For example, it may be beneficial to have a predetermined number (e.g., user specified or determined by the agent as it monitors performance) of network connections open in the cache for a server. If the number of open connections is less than the predetermined number, the agent sends at least one request to open a network connection to the server.

In a preferred embodiment, the cache stores all the network connections and an indication of whether the network connection is open, in use or closed. As the agent opens network connections, they are marked as "open." When the agent receives a request to open a network connection to the server and there is an open network connection to the server in the cache, the agent marks the network connection as "in use" or "used." When the agent receives an indication from the server that a network connection in the cache has been closed, the agent marks the network connection as "closed."

In another embodiment, the cache stores only open network connections. Each time a network connection in the cache is either used or closed, the agent removes the network connection from cache. The agent may also issue a request to the server to open a network connection to replace a network connection removed from the cache.

In conventional network systems, when a client wants to get an object from the server, it takes two round-trip times between the client and server: one to open the connection and one to get the object. With the present invention, one round-trip time between the agent and server may be avoided, thus reducing the overall time to one and a half round-trip times between the client and server. This provides a significant increase in the performance of the client.

Figure 7A:
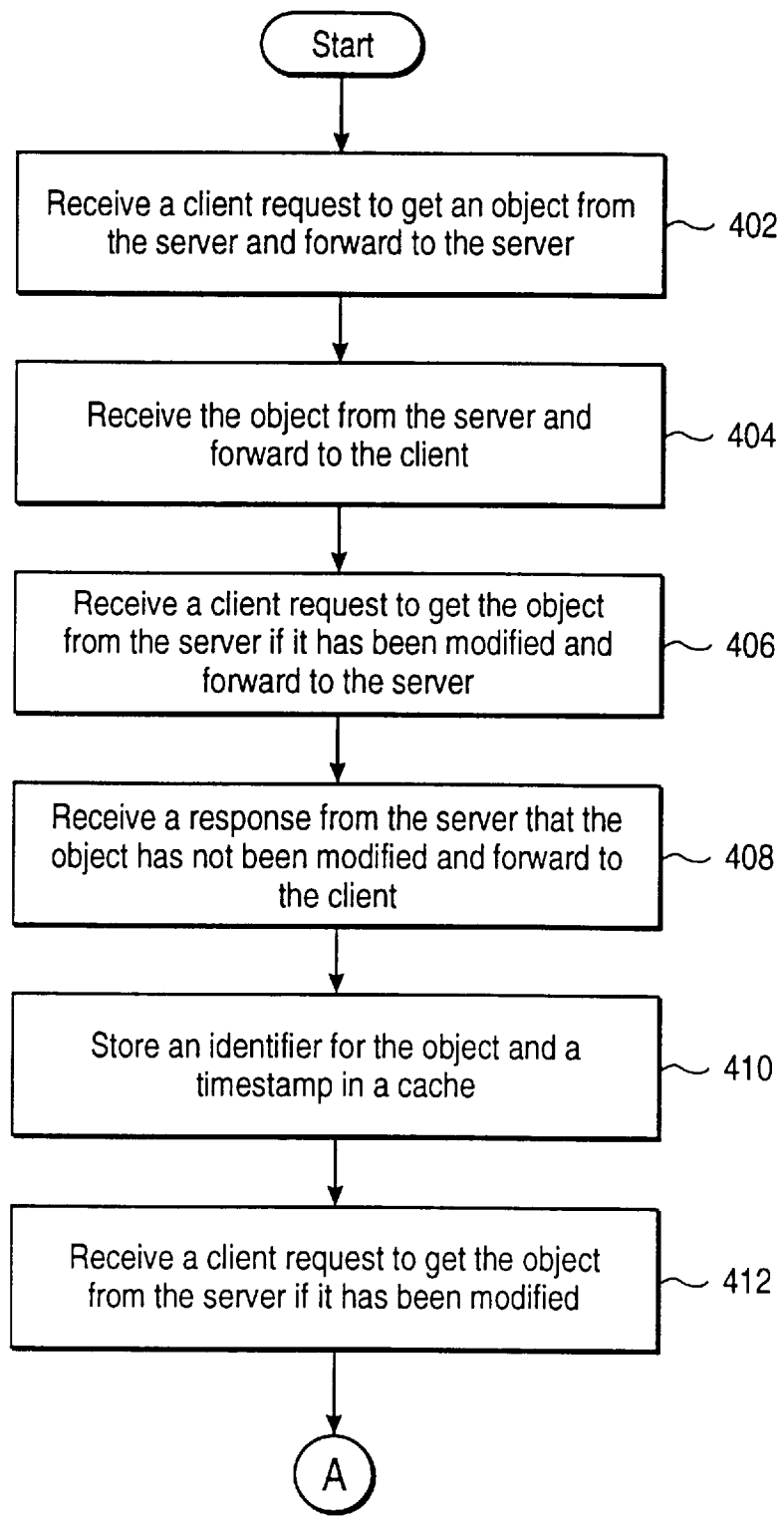
FIG. 7A and 7B show flowcharts of a process of increasing performance of requests to get an object on the server if it has been modified utilizing a cache.
Figure 7B:
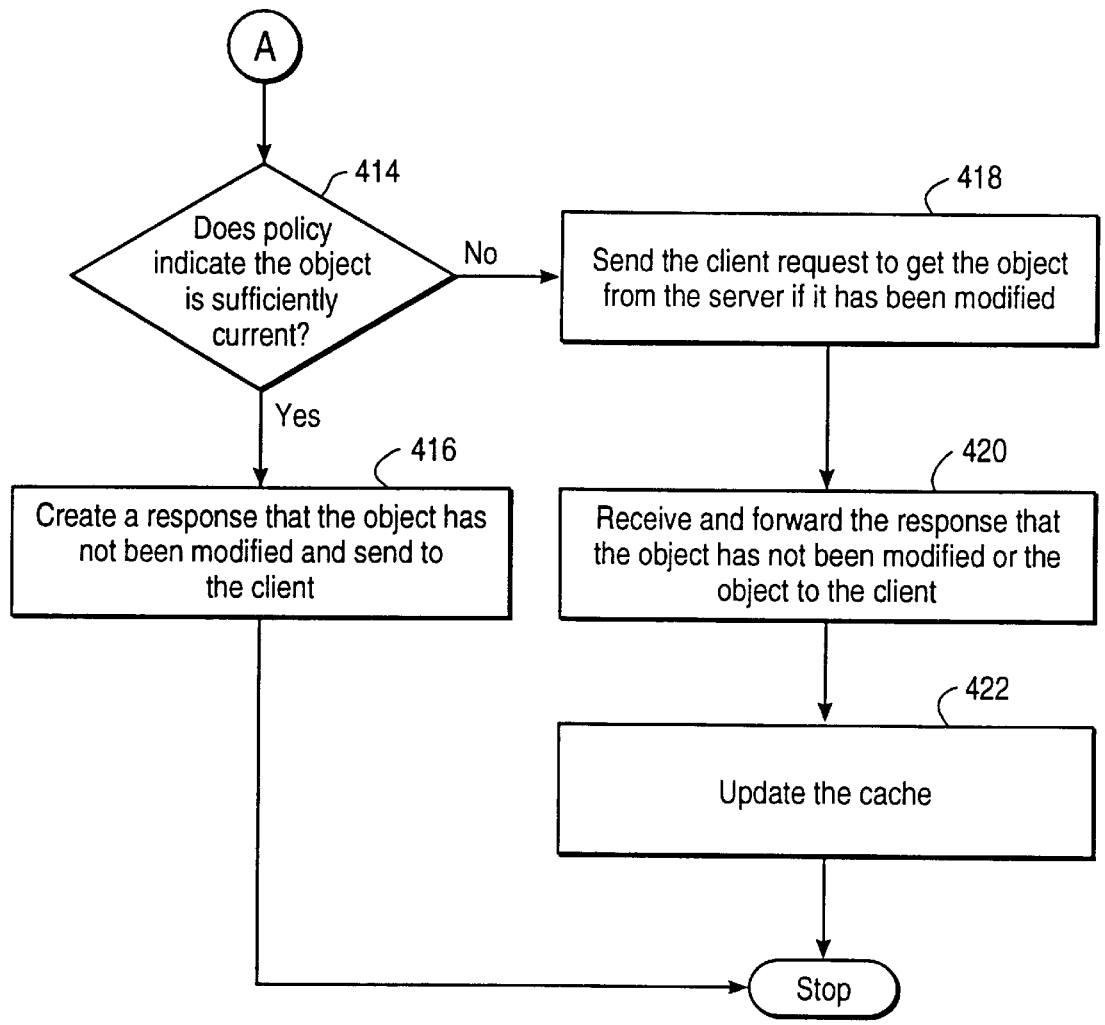

FIG. 7A and 7B show flowcharts of a process of increasing performance of requests to get an object on the server if it has been modified utilizing a cache. With HTTP, a client is able to request that the server send an object if it has not been modified since a specified time and date, which will be herein called a timestamp for convenience. More specifically, the header of an HTTP get message may include a header with fields specifying "If-Modified-Since" in one field and a timestamp in another field. If the server determines that the object has not been modified since the specified timestamp, the server does not need to send the object to the client but instead issues a not-modified (304) response.

Although this feature may be utilized by the browser to maintain its own cache, an agent of the present invention utilizes the feature to maintain a cache of information to further increase the performance of the computer network.

In general, it may take two client requests to set up the cache of information and a third client request to realize a performance increase. For completeness, the following assumes that browser does not have the desired object in its cache.

At step 402 in FIG. 7A, the agent receives a client request to get an object from the server. The agent then sends the client request to the server. The agent receives the object from the server and sends it to the client at step 404. Conventional browsers have a cache in which they store objects for future reference (e.g., when a user revisits the web page). The browser cache includes timestamps indicating the currency of the objects in the cache.

When the client desires an object in its cache, the browser sends a request to get the object if it has been modified since the timestamp specified in the browser cache. The agent receives this request and sends it to the server at step 406.

At step 408, the agent receives a response (304) from the server that the object has not been modified since the timestamp. The agent sends this response to the client. The agent stores an identifier for the object and the current timestamp in a cache (i.e., the timestamp of when the server indicated that the object had not changed) at step 410. The current timestamp will be utilized as an estimate of the time at which the object remained unmodified. The cache may be a table including the address of the object (e.g., an identifier), the timestamp of the object in the browser's cache and the current timestamp. The agent does not need to store the object in the cache.

The agent receives a request to get the object from the server if it has been modified at step 412. The agent determines if the request specifies an object in its caches by scanning the cache. As the previous client request described above requested this same object and received a not-modified response, the object is specified in the cache.

Now referring to FIG. 7B, the agent determines if policy indicates the object in the browser's cache is sufficiently current at step 414. The policy may be a comparison of the current timestamp to the timestamp in the cache of when the server last indicated that the object had not been modified. If the difference between these timestamps is within a predetermined amount of time, the object in the browser's cache is sufficiently current. The predetermined time may be set by a administrator or may be preset by the agent. Additional policy considerations may be applied. If the server does not change its contents often (e.g., as noticed by the agent), the amount of time may be lengthened. On the other hand, if the server does change its contents often (e.g., stock quotes), the amount of time may be shortened. Thus, the amount of time for an object still being current may be server, Web page or Uniform Resource Locator ("URL") specific.

At step 416, the agent has determined that the object in the browser's cache is sufficiently current and the agent sends a not-modified response to the client. The agent responds to the client without sending a request to the server, thereby saving a round-trip time between the agent and server.

If the agent determines that the browser's cache is not sufficiently current, the agent sends a request to get the object form the server if it has been modified at step 418. Thus, the agent sends the client request to the server. When the agent receives a response from the server, the agent sends the response to the client at step 420. The agent updates the cache according to the response at step 422. For example, the agent may store the current timestamp in the cache to indicate that at this point in time the server indicated that the object had not been modified. If a new copy of the object is received, the agent may also update the timestamp in the cache indicating the last time the browser received the object.

With the invention, the time for a client requesting an object if it has been modified may be reduced from one round-trip time between the client to the server to a round-trip time between the client and the agent (ignoring connection and disconnection times for the moment). Although the entries in the cache are client specific, the invention provides a significant performance increase for the clients when they issue a request to get an object if it has been modified.

Figure 8:
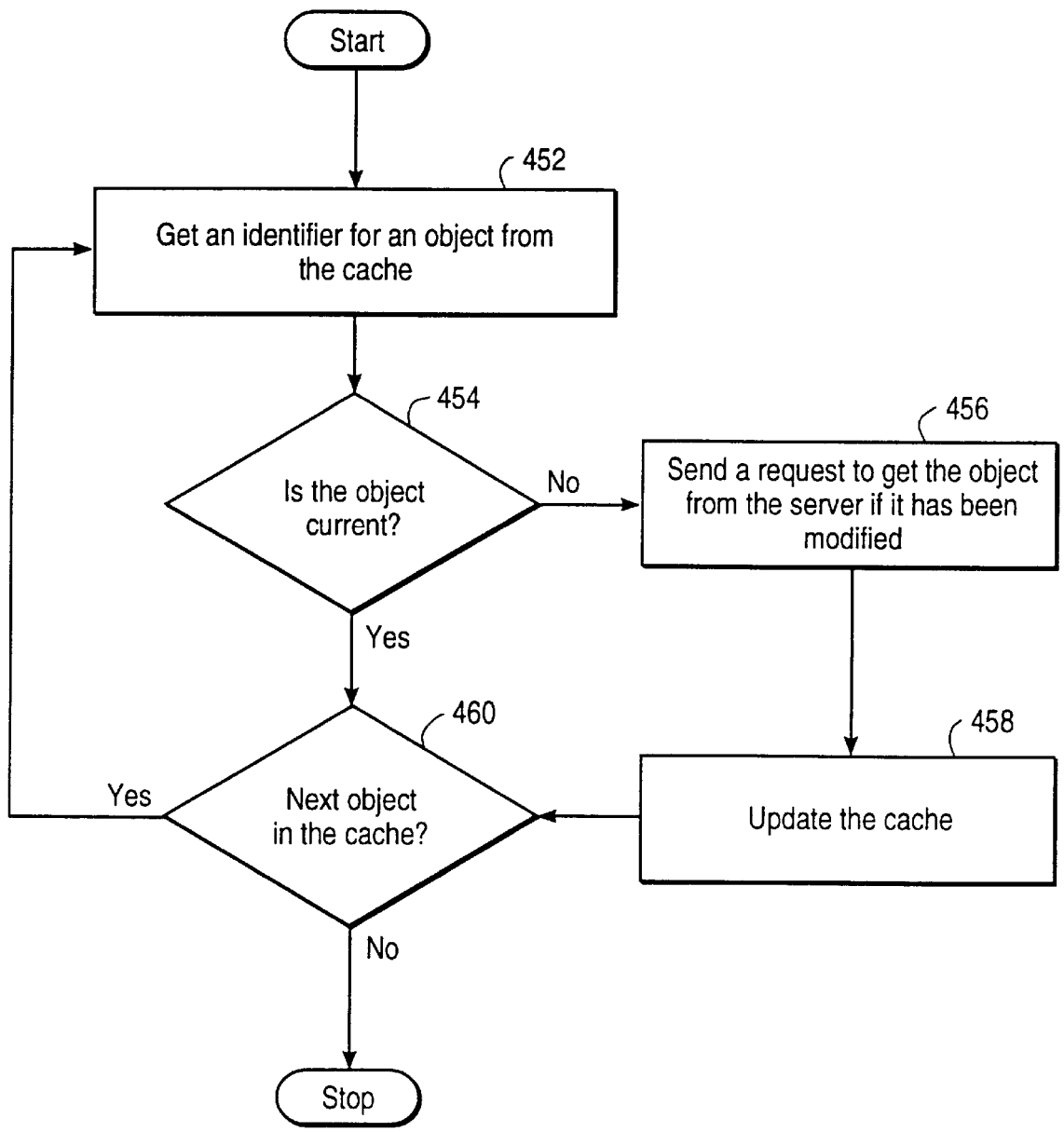
FIG. 8 shows a flowchart of a process of periodically refreshing information in the cache utilized in FIGS. 7A and 7B.

FIG. 8 shows a flowchart of a process of periodically refreshing information in the cache utilized in FIGS. 7A and 7B. Periodically (e.g., using a timer), the agent gets an identifier for an object in the cache at step 452. The agent then makes a determination of whether the object is sufficiently current at step 454. This may be done by the agent making the same calculation as if a client requested to get the object if it has been modified.

If the object is not sufficiently current, the agent sends a request to the server to get the object if it has been modified at step 456. This request originates from the agent and not the client. The agent then updates its cache at step 458 depending on the response from the server. If the server responds that the object has not been modified, the agent may update the estimate of the time at which the object remained unmodified. Otherwise, if the server sends a new copy of the object, the agent typically discards the new object and updates the cache to indicate the object has been modified. In other embodiments, the agent may store the new copy of the object in order to fulfill future client requests.

At step 460, the agent determines if there is another object identified in the cache. If there is, the agent tries to update the cache for that object. By periodically updating the cache, the performance of the client browser will increase as more round-trip times between the agent and server may be eliminated.

Figure 9:
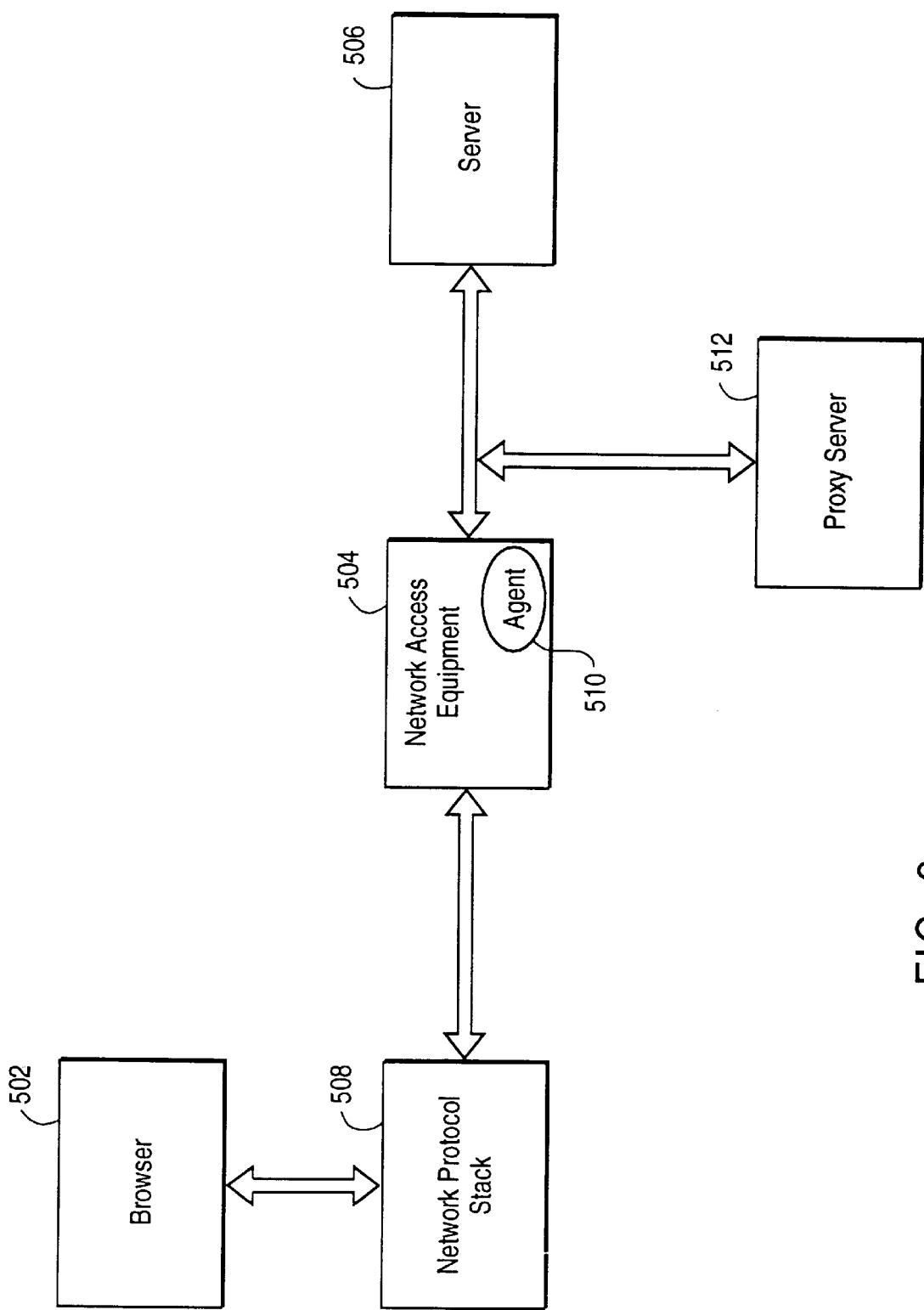
FIG. 9 is a block diagram of a browser connected to a Web server through network access equipment which utilizes a proxy server to increase performance.

FIG. 9 is a block diagram of a browser connected to a Web server through network access equipment which utilizes a proxy server to increase performance. The computer network shown includes a Web browser 502, network access equipment 504 and a Web server 506. The browser communicates over a link to the network access equipment via a network protocol stack 508. The browser and network protocol stack reside on the client computer system. The Web server resides on a server which is typically a remote computer system.

The network access equipment includes an agent 510. The agent shown is a program that receives HTTP requests and directs them to either the Web server or a proxy server 512. The agent will typically receives messages in a number of protocols but the discussion herein will focus on HTTP messages. The proxy server is a computer system that stores information available from the Web server. In general, it may be quicker to access information from the proxy server instead of the Web server.

Although the use of proxy servers is known, conventional systems require the client to specify whether an HTTP message be sent to the Web server or the proxy server. With the present invention the client need not explicitly specify the proxy server to gain an increase in performance resulting from use of the proxy server. The agent of the present invention sends the HTTP requests to either the Web server or proxy server based on an analysis of the HTTP request.

Figure 10:
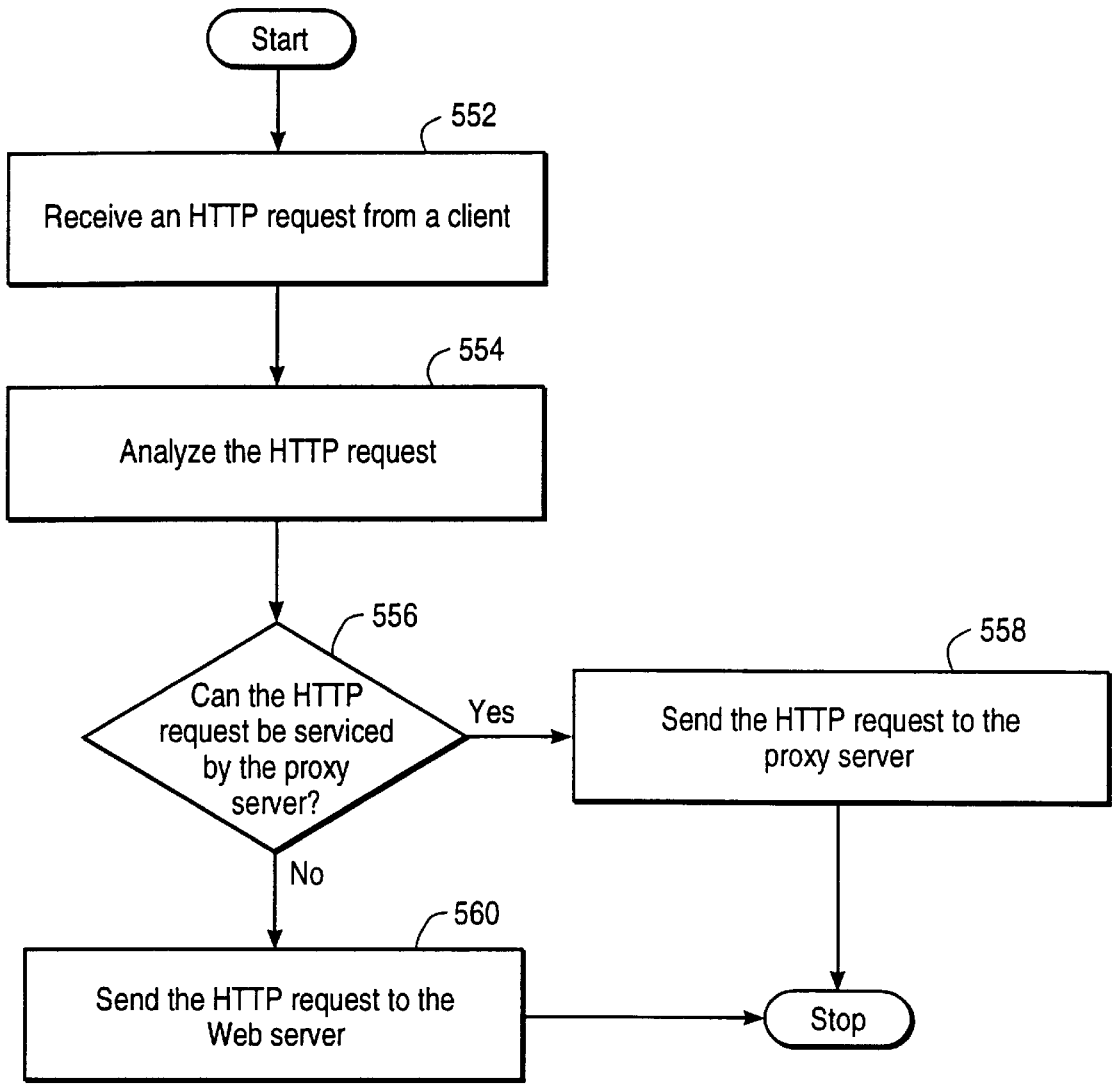
FIG. 10 shows a flowchart of a process of directing an HTTP request to either the Web server or the proxy server depending on the request.

FIG. 10 shows a flowchart of a process of directing an HTTP request to either the Web server or the proxy server depending on the request. At step 552, the agent receives an HTTP request from the client. The agent analyzes the HTTP request at step 554. The analysis may include a determination of whether the request gets information or posts information. Requests that post information may be sent to the Web server. However, requests that get information may be sent to the proxy server. There may also be other factors including determining if this information is likely to reside on the proxy server.

If it is determined that the HTTP request may be serviced by the proxy server at step 556, the agent sends the HTTP request to the proxy server at step 558. The agent may also need to translate the request to a different protocol before it is sent to the proxy server. Otherwise, the agent sends the HTTP request to the Web server at step 560.

The invention allows a client to obtain the benefits of a proxy server without needing to be modified to send requests explicitly to the proxy server. Thus, the proxy server may be changed or otherwise modified by effecting changes to the network access equipment while the client remains unchanged.

Figure 11:
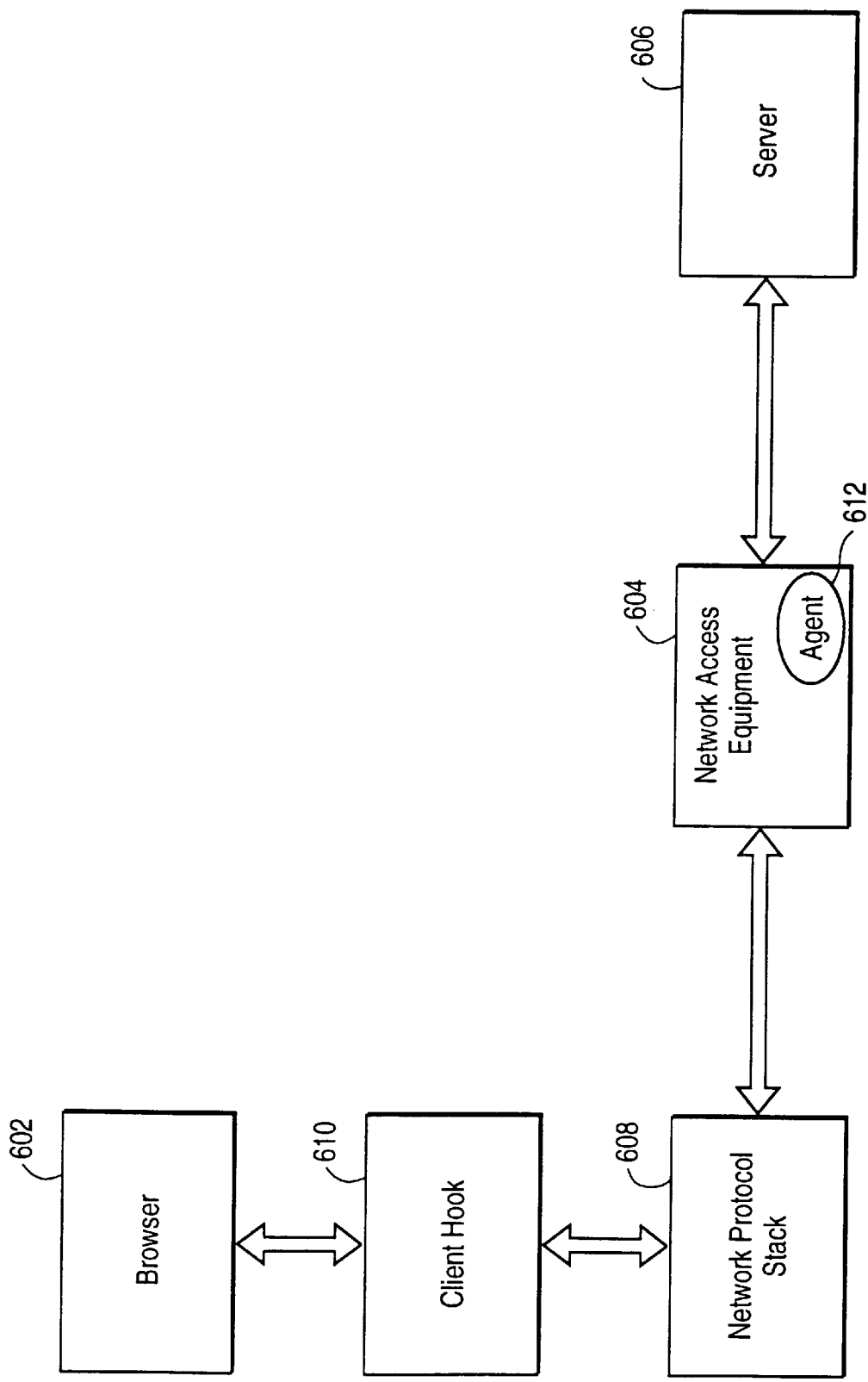
FIG. 11 is a block diagram of a browser connected to a Web server through network access equipment in which a client hook intercepts requests from the browser.

FIG. 11 is a block diagram of a browser connected to a Web server through network access equipment in which a client hook intercepts requests from the browser. The computer network shown includes a Web browser 602, network access equipment 604 and a Web server 606. The browser communicates over a link to the network access equipment via a network protocol stack 608. On the client computer system with the browser and network protocol stack is a client hook 610, the client hook intercepts calls between the browser and the network protocol stack.

In preferred embodiment, the client hook intercepts calls between the browser and the network protocol stack utilizing DLL chaining. For example, the dynamic link library WINSOCK.DLL is renamed to WINSOCKZ.DLL. A new WINSOCK.DLL is installed on the client computer system that has routines with the same name as in the original WINSOCK.DLL. However, the new WINSOCK.DLL has instructions in the routines (i.e., the client hook) to intercept calls before they are executed. In many instances, the routines in WINSOCK.DLL call the routines in WINSOCK-Z.DLL at some point in the routine.

The network access equipment includes an agent 612. The agent shown is a program that receives HTTP requests from the client hook. The client hook and agent communicate in such a way to increase performance of the computer network without requiring a modification of the client. Accordingly, a user is free to select the browser of his or her choice and still receive a significant performance increase.

In general, the client hook intercepts HTTP requests from the client to the server. The client hook modifies the HTTP requests from the client and sends the modified requests to the agent. The agent receives the modified requests and reconstructs the original HTTP requests from the client according to the modified requests. The agent then sends the HTTP requests from the client to the server. There is no requirement that the client hook and agent communicate via HTTP. Nevertheless, it is the communication between the client hook and the agent increases performance of communication between the client and the server.

The computer network shown in FIG. 11 may be utilized to increase performance of many procedures. For example, the procedure of opening a network connection to the server may be improved. Additionally, the procedure of sending headers within requests to the server may enhanced. These are but a couple examples of the present invention which will be described in more detail in reference to FIGS. 12–15.

Figure 12:
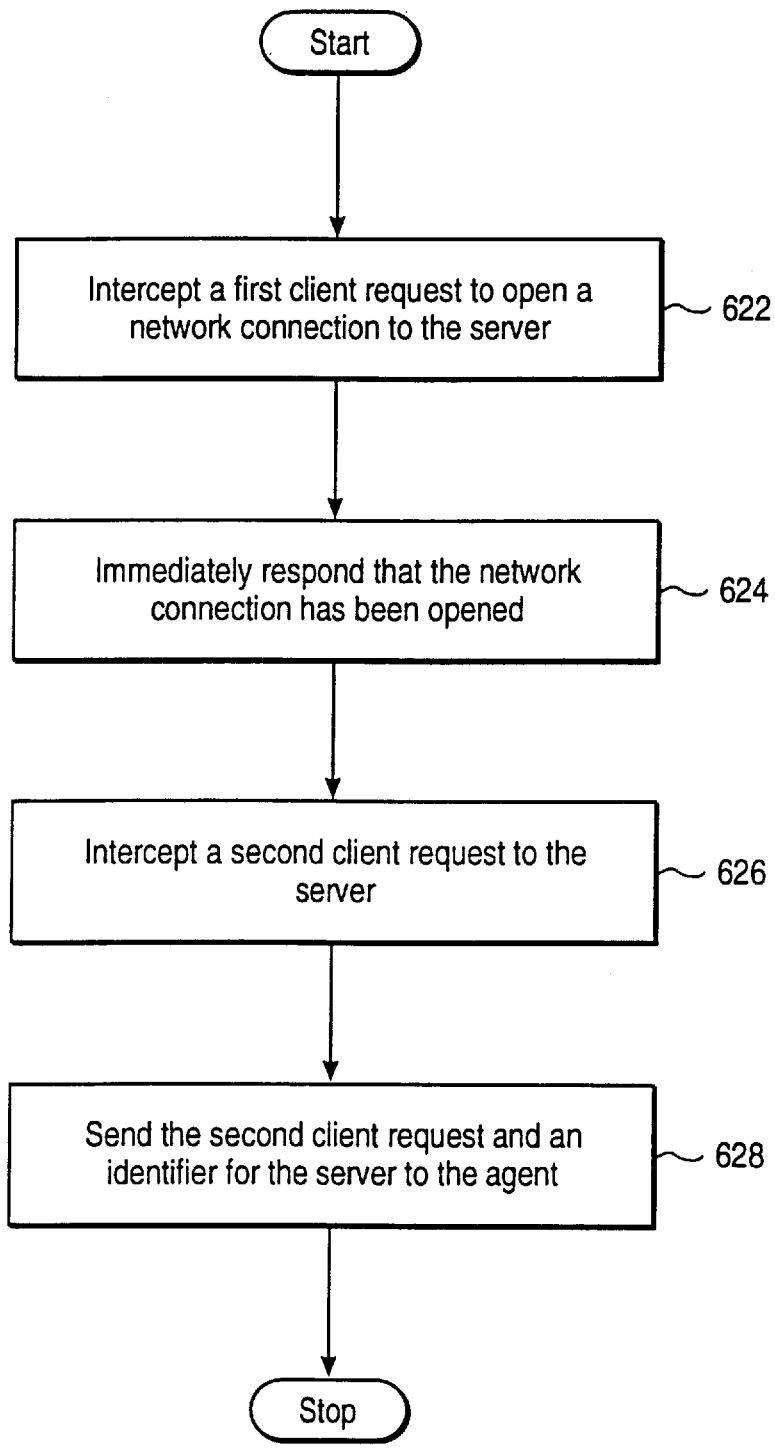
FIG. 12 shows a flowchart of a process of a client hook immediately responding that network connection has been opened in response to a request to open a network connection to the server.

FIG. 12 shows a flowchart of a process of a client hook immediately responding that network connection has been opened in response to a request to open a network connection to the server. At step 622, the client hook intercepts a client request to open a network connection to the server. The client hook immediately responds to the client that a dummy network connection has been opened at step 624. The dummy network connection is not an actual network connection but allows the client to proceed with the next client request.

The client hook intercepts a client request to the server that specifies the dummy network connection at step 626. At step 628, the client hook sends the client request and an identifier for the server to the agent. The identifier for the server (e.g., the address) is obtained from the client request to open a network connection. As the client hook and agent are in communication within the computer network, there is no requirement that the messages between the two conform to HTTP. Thus, the actual protocol utilized may be optimized for the actual link.

Figure 13:
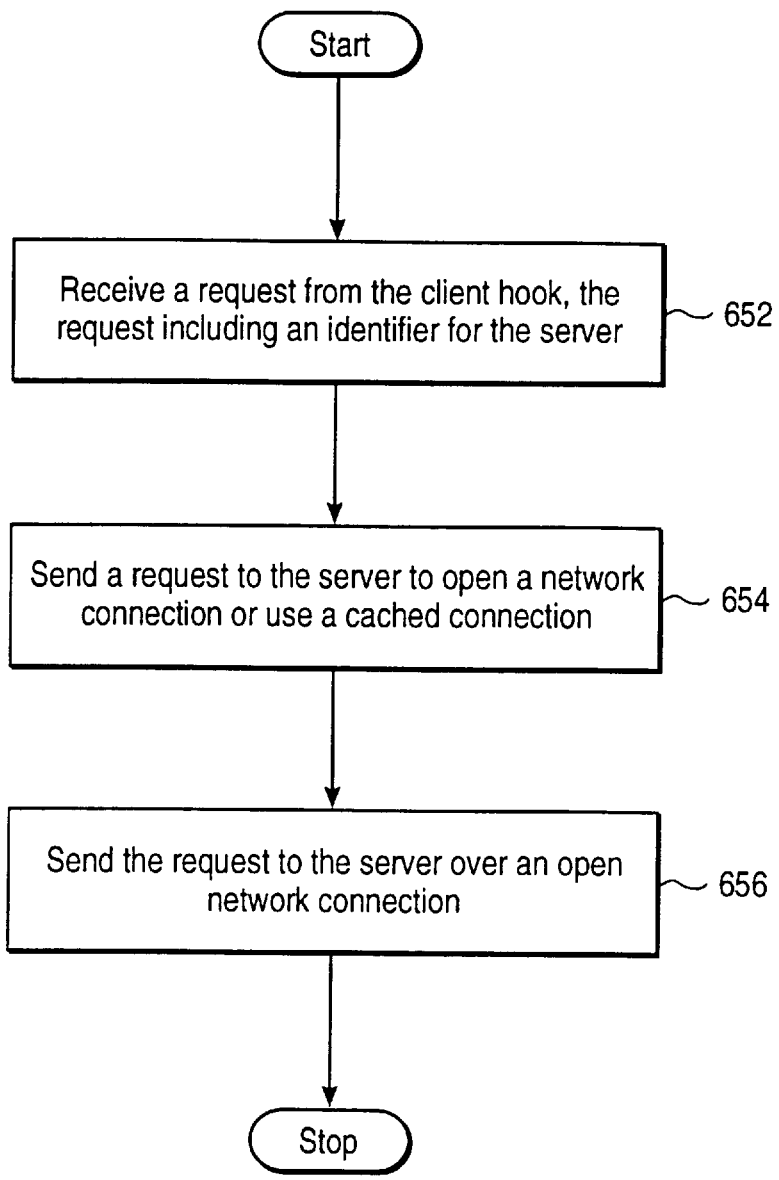
FIG. 13 shows a flowchart of a process of an agent receiving a request from the client hook that includes a request from the client and an identifier for the server to which the request should be sent.

FIG. 13 shows a flowchart of a process of an agent receiving a request from the client hook that includes a request from the client and an identifier for the server to which the request should be sent. At step 652, the agent receives a request from the client hook which includes an identifier for the server. The agent receives the request from the client hook without necessarily first receiving an HTTP client request to open a network connection to the server.

The agent generates and sends an HTTP request to the server to open a network connection at step 654. Preferably, the agent requests a persistent network connection. The server is identified by the identifier received from the client hook. Once the agent receives a response from the server that a network connection is open, the agent generates and sends the client request in the form of an HTTP request to the server at step 656.

The agent may send an HTTP request to open a network connection to the server. The agent may also maintain a cache of network connections as was described in reference to FIG. 6. In this manner, a round-trip time between the agent and server may be eliminated.

The invention increases performance in many ways. A round-trip time between the client and agent may be eliminated when opening a network connection to the server. This may be especially significant because this link may be the weak link in the computer network. Additionally, the protocol between the client hook and agent is not restricted to HTTP so it may more optimized.

Figure 14:
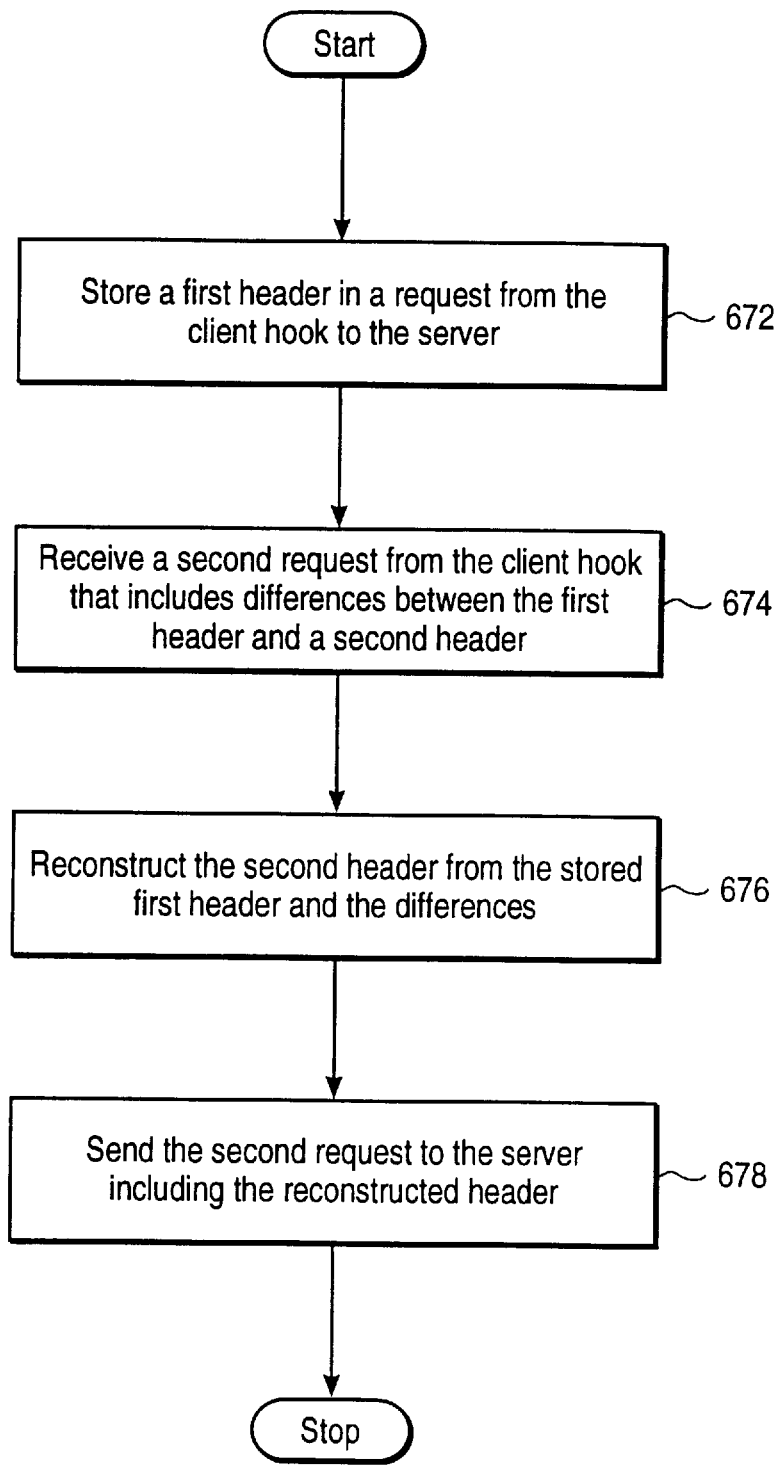
FIG. 14 shows a flowchart of a process of an agent storing a header and reconstructing another header from the differences between the headers.

FIG. 14 shows a flowchart of a process of an agent storing a header and reconstructing another header from the differences between the headers. Initially, the client hook intercepts client requests and sends them to the agent. As will be described below, the communication between the client hook and agent is preferably not HTTP as it is optimized. Additionally, although the embodiment described is directed to headers in the requests, the invention is applicable to any information within the requests.

When the agent receives a request from the client hook, the agent stores the header at step 672. The agent then generates and sends a corresponding HTTP request to the server. At step 674, the agent receives another request from the client hook that includes differences between the previous header and this header. The differences between headers is not currently a standard format of headers in HTTP.

The agent reconstructs the header for the current request from the client hook utilizing the stored header and the differences at step 676. At step 678, the agent uses the reconstructed header in generating and sending a corresponding HTTP request to the server.

The header typically includes information about the browser (e.g., name and version number), acceptable data formats, and the like similar to a Multipurpose Internet Mail Extensions ("MIME") header. Accordingly, much of the header does not change from request to request. With the invention, an HTTP request may be reduced from several hundred bytes to a request that is less than twenty bytes. This is especially significant as the link between the client hook and agent is typically the weak link in the computer network. The following describes an embodiment of this process in more detail.

Figure 15:
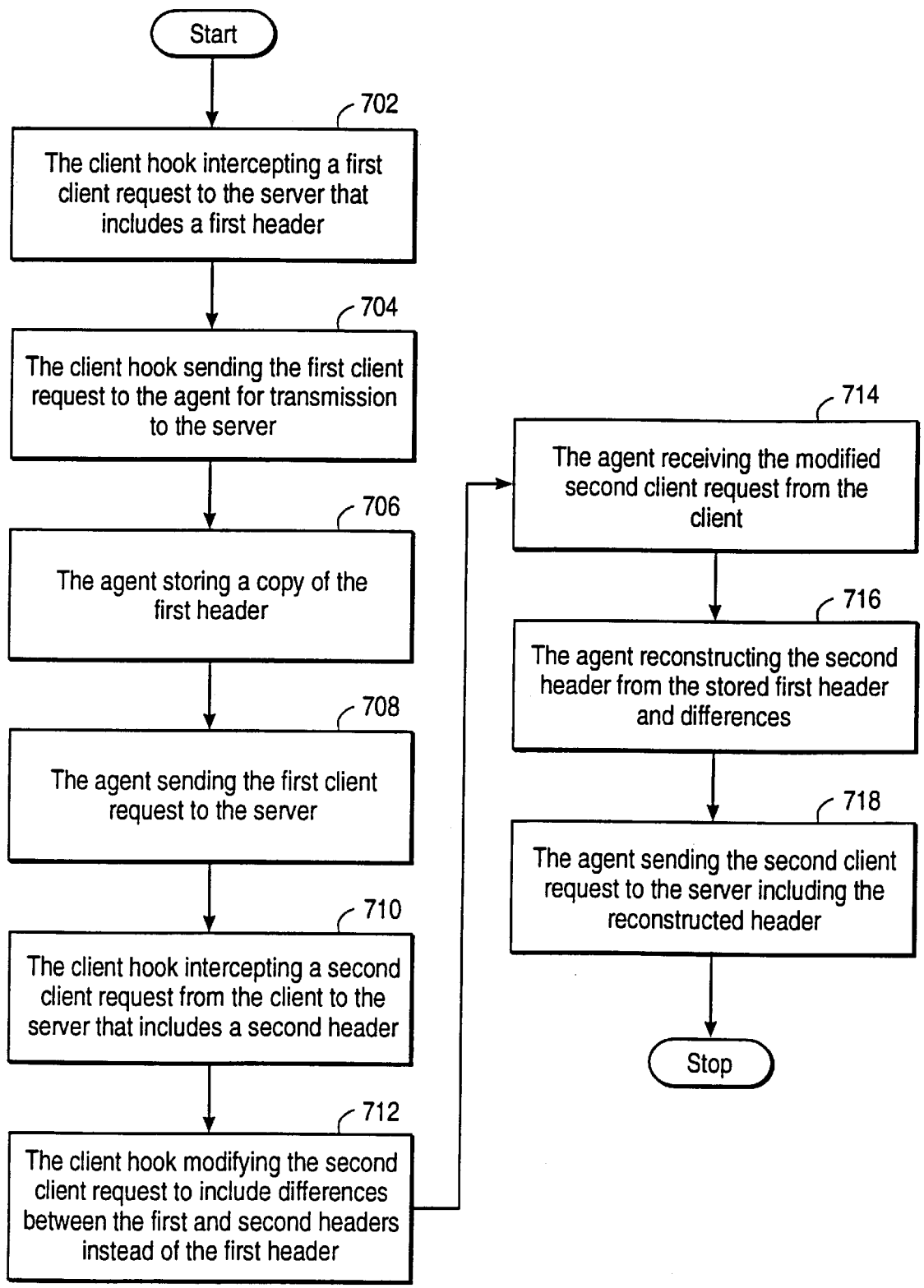
FIG. 15 shows a flowchart of a process of a client hook and agent increasing the performance of header transmission.

FIG. 15 shows a flowchart of a process of a client hook and agent increasing the performance of header transmission. At step 702, the client hook intercepts a client request to the server that includes a header, which the client hook stores. The client request is an HTTP request and the client hook utilize a more optimized protocol (i.e., non-HTTP) when it sends the client request to the agent.

The client hook sends the client request to the agent for transmission to the server at step 704. Once the agent receives the client request, the agent stores a copy of the header in the client request at step 706. If the client request is non-HTTP, the agent generates a corresponding HTTP client request. The agent sends the client request to the server at step 708.

At step 710, the client hook intercepts a client request to the server that includes a header. The client hook modifies the client request to include a header that specifies differences between this header and the previous header at step 712. Thus, the client request will contain the differences or deltas between the headers.

The agent receives the modified client request at step 714. With the modified client request, the agent reconstructs the header from the stored header and the differences between the headers at step 716. The agent generates an HTTP request that corresponds to the client request and includes the reconstructed header. The agent sends the client request to the server at step 718.

The invention increases performance in many ways. A round-trip time between the client and agent may be eliminated when opening a network connection to the server. This may be especially significant because the link between the client hook and agent may be substantially slower than the link between the agent and server. Additionally, the protocol between the client hook and agent is not restricted to HTTP so it may be more optimized.

While the above is a complete description of preferred embodiments of the invention, various alternatives, modifications and equivalents may be used. It should be evident that the present invention is equally applicable by making appropriate modifications to the embodiments described above. For example, although the embodiments have been described individually, many of the embodiments may be combined to further increase performance. Therefore, the above description should not be taken as limiting the scope of the invention which is defined by the metes and bounds of the appended claims along with their full scope of equivalents.

What is claimed is:

1. In a computer network, a method executed by an agent in the computer network between clients and a server for increasing performance between the clients and the server, the method comprising the steps of:

receiving a first request from a client to open a single network connection to the server;

sending a plurality of requests to the server to open a plurality of network connections to the server;

receiving a second request from the client;

sending the second request to the server using one of the plurality of network connections;

wherein the plurality of network connections to the server are opened in response to the first request from the client to open a single network connection.

2. The method of claim 1, further comprising the steps of:

receiving a third request from a client to open a single network connection to the server;

sending a response to the client that a network connection is open;

receiving a fourth request from the client; and sending the fourth request to the server using one of the plurality of network connections previously obtained in response to the first request.

3. The method of claim 2, further comprising the step of sending a request to the server to open a network connection to the server in order to replace the one of the plurality of network connections being used.

4. The method of claim 1, further comprising the step of storing the plurality of network connections in a cache of network connections.

5. The method of claim 4, further comprising the steps of:

receiving a third request from a client to open a single network connection to the server;

scanning the cache to determine if there is an open network connection to the server in the cache; and if there is an open network connection in the cache, sending a response to the client that a network connection is open, whereby the open network connection becomes used.

6. The method of claim 5, further comprising the steps of:

determining if network connection caching increases performance between the clients and the server; and if network caching increases performance, sending a request to the server to open a network connection to the server in order to store another open network connection in the cache to replace the used network connection.

7. The method of claim 4, further comprising the steps of:

determining the number of open network connections to the server stored in the cache; and if the number of open network connections is less than a predetermined number, sending a request to the server to open a network connection to the server in order to store another open network connection in the cache.

8. The method of claim 4, further comprising the steps of:

determining if an open network connection to the server in the cache has been closed; and if there is a closed network connection in the cache, sending a request to the server to open a network connection to the server in order to store an open network connection in the cache.

9. The method of claim 5, further comprising the step of removing the used network connection from the cache.

10. The method of claim 5, further comprising the step of sending a request to the server to open a network connection to the server in order to store another open network connection in the cache to replace the used network connection.

11. The method of claim 1, wherein the client is a World Wide Web browser.

12. A computer network, comprising:

a client computer running a Web browser;

a Web server networked to the client computer;

a proxy server computer networked to the client computer for storing information available on the Web server; and network access equipment, networked between the client computer and the Web and proxy servers, including an agent that receives an HTTP request from the Web browser to open a single network connection to the server and sends a plurality of requests to the server to open a plurality of network connections to the server;

wherein the plurality of network connections to the server are opened in response to the HTTP request from the Web browser to open a single network connection.

13. In a computer network, a method executed by an agent in the computer network between clients and a server for increasing performance between the clients and the server, the method comprising the steps of:

receiving a first request from a client to get an object from the server if the object has been modified after a specific timestamp;

sending the first request to the server;

receiving a first response from the server that the object has not been modified after the specific timestamp;

sending the first response to the client;

storing an identifier for the object and a timestamp in a cache;

receiving a second request from the client to get the object from the server if the object has been modified after the specific timestamp; and if the timestamp stored in the cache is within a predetermined amount of time from the current time, sending a second response to the client that the object has not been modified after the specific timestamp without sending the second request to the server.

14. The method of claim 13, wherein the storing step includes the steps of storing a location of the object as the identifier, storing the specific timestamp, and storing the timestamp as the current time in order to estimate at what time the object remained unmodified.

15. The method of claim 14, further comprising the step of periodically sending requests to the server to get objects identified in the cache if the object has been modified after the specific timestamp in order to update the timestamp in the cache.

16. The method of claim 13, further comprising the step of setting the predetermined amount of time.

17. The method of claim 13, wherein the client is a World Wide Web browser.

18. A computer network, comprising:

a client computer running a Web browser;

a Web server networked to the client computer;

a proxy server computer networked to the client computer for storing information available on the Web server; and network access equipment, networked between the client computer and the Web and proxy servers, including an agent that stores identifiers and timestamps for objects so that when the agent receives a request from the Web browser to get an object from the server if the object has been modified after a specific timestamp, the agent responds to the request without sending a request to the Web server.

19. In a computer network, a method executed by an agent in the computer network between a client and a Web and proxy servers for increasing performance between the client and the Web server, comprising the steps of:

receiving an HTTP request from a client; and sending the HTTP request to either the Web server or the proxy server depending on the HTTP request, the proxy server storing information available on the Web server;

wherein the client does not need to be modified to utilize the proxy server.

20. The method of claim 19, wherein if the HTTP request may be serviced by the proxy server, the HTTP request is sent to the proxy server, and otherwise the HTTP request is sent to the Web server.

21. The method of claim 19, wherein if the HTTP request is to post information to the server, the HTTP request is sent to the Web server, and otherwise the HTTP request is sent to the proxy server.

22. The method of claim 19, further comprising the step of translating the HTTP request to a different protocol before the HTTP request is sent to the proxy server.

23. The method of claim 19, wherein the client is a World Wide Web browser.

24. A computer network, comprising:

a client computer running a Web browser;

a Web server networked to the client computer;

a proxy server computer networked to the client computer for storing information available on the Web server; and network access equipment, networked between the client computer and the Web and proxy servers, including an agent that receives HTTP requests and sends the HTTP requests to either the Web server or the proxy server depending on each HTTP request;

wherein software on the client computer does not need to be modified to utilize the proxy server.

25. The computer network of claim 24, wherein HTTP requests that may be serviced by the proxy server are sent to the proxy server, otherwise the HTTP requests are sent to the Web server.

26. The computer network of claim 24, wherein HTTP requests that post information to the server are sent to the Web server, otherwise the HTTP requests are sent to the proxy server.

27. The computer network of claim 24, wherein the HTTP requests are translated to a different protocol before the HTTP requests are sent to the proxy server.

28. In a computer network, a method for increasing performance between a client on a client computer and a server utilizing a client hook on the client computer and an agent between the client computer and the server, comprising the steps of:

the client hook intercepting requests from the client to the server;

the client hook modifying the requests from the client;

the client hook sending the modified requests to the agent;

the agent reconstructing the requests from the client according to the modified requests; and the agent sending the requests from the client to the server;

wherein communication between the client hook and the agent increases performance of communication between the client and the server.

29. The method of claim 28, further comprising the steps of:

the client hook intercepting a first request from the client to open a network connection to the server, the first request including an identifier for the server;

the client hook immediately responding that a network connection to the server has been opened to the server and storing the identifier of the server;

the client hook intercepting a second request from the client to be sent over the opened network connection to the server; and the client hook sending the second request and the identifier of the server to the agent.

30. The method of claim 29, further comprising the steps of:

the agent sending a third request to open a network connection to the server identified by the identifier; and the agent sending the second request to the server over an open network connection.

31. The method of claim 29, further comprising the steps of:

the agent identifying an open network connection to the server in a cache; and the agent sending the second request to the server over the open network connection.

32. The method of claim 29, further comprising the steps of:

without first receiving a request from the client to open a network connection to the server, the agent receiving a first request from the client to the server and an identifier for the server;

utilizing the identifier for the server, the agent sending a second request to the server to open a network connection; and the agent sending the first request to the server over an open network connection.

33. The method of claim 28, further comprising the steps of:

the agent storing first information included in a first request from the client to the server;

the agent receiving a second request from the client to the server that includes differences between the first information and second information of the second request instead of the second information;

the agent reconstructing the second information from the stored first information and the differences between the first and second information; and the agent sending the second request to the server including the reconstructed second information.

34. The method of claim 28, further comprising the steps of:

the client hook intercepting a first request from the client to the server that includes first information;

the client hook sending the first request to the agent for sending to the server;

the agent storing a copy of the first information;

the agent sending the first request to the server;

the client hook intercepting a second request from the client to the server that includes second information;

the client hook modifying the second request to include differences between the first and second information instead of the second information;

the agent receiving the modified second request from the client;

the agent reconstructing the second information from the stored first information and the differences between the first and second information; and the agent sending the second request to the server including the reconstructed second information.

35. The method of claim 28, wherein the network link between the client computer and the agent is substantially slower than the network link between the agent and the server.

36. In a computer network, a method for increasing performance between a client on a client computer and a server utilizing a client hook on the client computer and an agent between the client computer and the server, comprising the steps of:

the client hook intercepting a first request from the client to open a network connection to the server, the first request including an identifier for the server;

the client hook immediately responding that a network connection to the server has been opened to the server and storing the identifier of the server;

the client hook intercepting a second request from the client to be sent over the opened network connection to the server; and the client hook sending the second request and the identifier of the server to the agent.

37. The method of claim 36, further comprising the steps of:

the agent sending a third request to open a network connection to the server identified by the identifier; and the agent sending the second request to the server over an open network connection.

38. The method of claim 36, further comprising the steps of:

the agent identifying an open network connection to the server in a cache; and the agent sending the second request to the server over the open network connection.

39. The method of claim 36, wherein the second request to the server to open a network connection includes a request to keep the network connection open.

40. In a computer network, a method executed by an agent in the computer network between a client and a server for increasing performance between the client and the server, the method comprising the steps of:

without first receiving a request from the client to open a network connection to the server, receiving a first request from the client to the server and an identifier for the server;

utilizing the identifier for the server, sending a second request to the server to open a network connection; and sending the first request to the server over an open network connection.

41. The method of claim 40, wherein the second request to the server to open a network connection includes a request to keep the network connection open.

42. The method of claim 40, wherein the client is a World Wide Web browser.

43. In a computer network, a method executed by an agent in the computer network between a client and a server for increasing performance between the client and the server, the method comprising the steps of:

storing first information included in a first request from the client to the server;

receiving a second request from the client to the server that includes differences between the first information and second information of the second request instead of the second information;

reconstructing the second information from the stored first information and the differences between the first and second information; and sending the second request to the server including the reconstructed second information.

44. The method of claim 43, wherein the first and second requests are HTTP requests.

45. In a computer network, a method for increasing performance between a client on a client computer and a server utilizing a client hook on the client computer and an agent between the client computer and the server, comprising the steps of:

the client hook intercepting a first request from the client to the server that includes first information;

the client hook sending the first request to the agent for sending to the server;

the agent storing a copy of the first information;

the agent sending the first request to the server;

the client hook intercepting a second request from the client to the server that includes second information;

the client hook modifying the second request to include differences between the first and second information instead of the second information;

the agent receiving the modified second request from the client;

the agent reconstructing the second information from the stored first information and the differences between the first and second information; and the agent sending the second request to the server including the reconstructed second information.

46. The method of claim 45, wherein the client hook intercepts requests from the client utilizing dynamic link library chaining.

47. The method of claim 45, wherein the first and second requests are HTTP requests.

48. The method of claim 45, wherein the client is a World Wide Web browser.

* * * * *